United States Patent
Carnevali

(10) Patent No.: US 11,076,032 B1
(45) Date of Patent: Jul. 27, 2021

(54) CRADLES FOR MOBILE DEVICES WITH A PLUNGER LOCK AND METHODS OF MAKING AND USING

(71) Applicant: National Products, Inc., Seattle, WA (US)

(72) Inventor: Jeffrey D. Carnevali, Seattle, WA (US)

(73) Assignee: NATIONAL PRODUCTS, INC., Seattle, WA (US)

( * ) Notice: Subject to any disclaimer, the term of this patent is extended or adjusted under 35 U.S.C. 154(b) by 0 days.

(21) Appl. No.: 16/883,760

(22) Filed: May 26, 2020

(51) Int. Cl.
| *H04M 1/00* | (2006.01) |
| *H04M 1/04* | (2006.01) |
| *F16M 11/04* | (2006.01) |
| *H04B 1/3877* | (2015.01) |
| *A45F 5/00* | (2006.01) |

(52) U.S. Cl.
CPC ............ *H04M 1/04* (2013.01); *F16M 11/041* (2013.01); *H04B 1/3877* (2013.01); *A45F 5/00* (2013.01); *A45F 2200/0516* (2013.01)

(58) Field of Classification Search
CPC ...... F16M 13/00; F16M 11/04; F16M 11/041; H04M 1/04; A45F 5/00; A45F 2200/0516; H04B 1/3877
See application file for complete search history.

(56) References Cited

U.S. PATENT DOCUMENTS

| 809,977 A | 1/1906 | O'Brien |
| 1,786,459 A | 7/1926 | Simons |
| 2,495,552 A | 1/1950 | Schmitz |

(Continued)

FOREIGN PATENT DOCUMENTS

| CN | 101674096 | 3/2010 |
| CN | 202268924 | 6/2012 |

(Continued)

OTHER PUBLICATIONS

Otterbox Product directory, 20 pages of product description of Otter Box waterproof boxes retrieved from web site at: www.otterbox.com Dated Sep. 2, 2005. Otter Products, LLC, Bldg. 1 Old-Town Square, Suite 303, Fort Collins, CO 80524 Phone: 1-888-695-8820, 970-493-8446; Facsimile: 1-888-695-8827, 970-493-1755.

(Continued)

*Primary Examiner* — Nhan T Le
(74) *Attorney, Agent, or Firm* — Branch Partners PLLC; Bruce E. Black

(57) ABSTRACT

A cradle for a mobile device includes a cradle base; a top element movable relative to the cradle base and configured to retain a top portion of a mobile device loaded into the cradle; a bottom element coupled to the cradle base and configured to retain a bottom portion of a mobile device or a case containing the mobile device loaded into the cradle; and a locking mechanism having a housing and a plunger at least partially disposed in the housing and configured for moving, relative to the housing, between a lock position and an unlock position. In the lock position, the plunger engages the top element to hinder movement of the top element relative to the cradle base and, in the unlock position, the plunger does not engage the top element to permit loading or unloading of the mobile device from the cradle.

20 Claims, 7 Drawing Sheets

(56) References Cited

U.S. PATENT DOCUMENTS

| | | | |
|---|---|---|---|
| 2,549,917 A | 4/1951 | Millbrandt | |
| 2,565,939 A | 8/1951 | Wriston | |
| 2,612,947 A | 10/1952 | Jenks | |
| 2,717,093 A | 9/1955 | Mautner | |
| 2,803,368 A | 8/1957 | Koch | |
| 3,018,525 A | 1/1962 | Deisenroth | |
| 3,140,883 A | 7/1964 | Anthony | |
| 3,464,579 A | 9/1969 | Asenbauer | |
| 3,667,648 A | 6/1972 | Koziol | |
| 3,885,701 A | 5/1975 | Becklin | |
| 3,972,459 A | 8/1976 | Cooper | |
| 3,978,830 A | 9/1976 | Toth, Jr. | |
| 4,298,204 A | 11/1981 | Jinkins | |
| 4,564,880 A | 1/1986 | Christ et al. | |
| 4,607,772 A | 7/1986 | Hancock | |
| 4,828,558 A | 5/1989 | Kelman | |
| 4,842,174 A | 6/1989 | Sheppard et al. | |
| 4,848,319 A | 7/1989 | Appeldorn | |
| 5,002,184 A | 3/1991 | Lloyd | |
| 5,096,317 A | 3/1992 | Phillippe | |
| 5,135,189 A | 8/1992 | Ghazizadeh | |
| 5,246,133 A | 9/1993 | James | |
| 5,272,771 A | 12/1993 | Ansell et al. | |
| 5,295,602 A | 3/1994 | Swanson | |
| 5,353,934 A | 10/1994 | Yamauchi | |
| 5,535,274 A | 7/1996 | Braitberg et al. | |
| 5,584,054 A | 12/1996 | Tyneski et al. | |
| 5,586,002 A | 12/1996 | Notarianni | |
| 5,641,065 A | 6/1997 | Owens et al. | |
| 5,646,649 A | 7/1997 | Iwata et al. | |
| 5,791,506 A | 8/1998 | Sheffler et al. | |
| 5,813,096 A | 9/1998 | Soennichsen | |
| 5,822,427 A | 10/1998 | Braitberg et al. | |
| 5,842,670 A | 12/1998 | Nigoghosian | |
| 5,845,885 A | 12/1998 | Carnevali | |
| 5,860,550 A | 1/1999 | Miller et al. | |
| 5,888,087 A * | 3/1999 | Hanson | B60R 16/0231 439/297 |
| 5,895,018 A | 4/1999 | Rielo | |
| 5,953,795 A | 9/1999 | Bauer | |
| 5,969,057 A | 10/1999 | Schoeley et al. | |
| 5,990,874 A | 11/1999 | Tsumura et al. | |
| 5,992,807 A | 11/1999 | Tarulli | |
| 6,009,601 A | 1/2000 | Kaufman | |
| 6,010,005 A | 1/2000 | Reames et al. | |
| 6,032,910 A | 3/2000 | Richter | |
| 6,034,505 A | 3/2000 | Arthur et al. | |
| 6,035,800 A | 3/2000 | Clifford | |
| 6,043,626 A | 3/2000 | Snyder et al. | |
| 6,068,119 A | 5/2000 | Derr et al. | |
| 6,149,116 A | 11/2000 | Won | |
| 6,229,893 B1 | 5/2001 | Chen | |
| 6,273,773 B1 | 8/2001 | Bourke | |
| 6,276,552 B1 | 8/2001 | Vervisch | |
| 6,295,198 B1 | 9/2001 | Loh et al. | |
| 6,341,218 B1 | 1/2002 | Poplawsky et al. | |
| 6,356,053 B1 | 3/2002 | Sandoz et al. | |
| 6,377,825 B1 | 4/2002 | Kennedy et al. | |
| 6,406,758 B1 | 6/2002 | Bottari et al. | |
| 6,407,860 B1 | 6/2002 | Funazaki et al. | |
| 6,438,229 B1 * | 8/2002 | Overy | H02J 7/0044 379/446 |
| 6,572,176 B2 | 6/2003 | Davies et al. | |
| 6,585,212 B2 | 7/2003 | Carnevali | |
| 6,588,637 B2 | 7/2003 | Gates et al. | |
| 6,597,924 B1 | 7/2003 | Smith | |
| 6,614,423 B1 | 9/2003 | Wong et al. | |
| 6,646,864 B2 | 11/2003 | Richardson | |
| 6,648,376 B2 | 11/2003 | Christianson | |
| 6,687,516 B2 | 2/2004 | Chen | |
| 6,702,604 B1 | 3/2004 | Moscovitch | |
| 6,754,343 B2 | 6/2004 | Lundstrom et al. | |
| 6,762,585 B2 | 7/2004 | Liao | |
| 6,776,422 B1 | 8/2004 | Toy | |
| 6,785,566 B1 | 8/2004 | Irizarry | |
| 6,785,567 B2 | 8/2004 | Kato | |
| 6,816,713 B2 | 11/2004 | Chen | |
| 6,842,171 B2 | 1/2005 | Richter et al. | |
| 6,953,126 B2 | 10/2005 | Parker et al. | |
| 6,984,680 B2 | 1/2006 | Quinn | |
| 6,995,976 B2 | 2/2006 | Richardson | |
| 7,017,243 B2 | 3/2006 | Carnevali | |
| 7,031,148 B1 | 4/2006 | Lin | |
| 7,068,783 B2 | 6/2006 | Peiker | |
| 7,158,376 B2 | 1/2007 | Richardson et al. | |
| 7,180,735 B2 | 2/2007 | Thomas et al. | |
| 7,230,823 B2 | 6/2007 | Richardson et al. | |
| 7,248,901 B2 | 7/2007 | Peiker | |
| 7,257,429 B2 | 8/2007 | Kogan | |
| 7,283,849 B2 | 10/2007 | Peiker | |
| 7,311,526 B2 | 12/2007 | Rohrbach et al. | |
| 7,312,984 B2 | 12/2007 | Richardson et al. | |
| 7,351,066 B2 | 4/2008 | DiFonzo et al. | |
| 7,464,814 B2 | 12/2008 | Carnevali | |
| 7,480,138 B2 | 1/2009 | Kogan et al. | |
| 7,481,664 B1 | 1/2009 | Knoll et al. | |
| 7,517,222 B2 | 4/2009 | Rohrbach et al. | |
| 7,520,389 B2 | 4/2009 | Lalouette | |
| 7,551,458 B2 | 6/2009 | Carnevali | |
| 7,566,224 B2 | 7/2009 | Wu | |
| 7,594,576 B2 | 9/2009 | Chen et al. | |
| 7,609,512 B2 | 10/2009 | Richardson et al. | |
| 7,612,997 B1 | 11/2009 | Diebel et al. | |
| 7,641,477 B2 | 1/2010 | DiFonzo et al. | |
| 7,645,143 B2 | 1/2010 | Rohrbach et al. | |
| 7,663,879 B2 | 2/2010 | Richardson et al. | |
| 7,688,580 B2 | 3/2010 | Richardson et al. | |
| 7,812,567 B2 | 10/2010 | Shen | |
| 7,841,776 B2 | 11/2010 | DiFonzo et al. | |
| 7,850,032 B2 | 12/2010 | Carnevali et al. | |
| 7,855,529 B2 | 12/2010 | Liu | |
| 7,889,489 B2 | 2/2011 | Richardson et al. | |
| 7,901,216 B2 | 3/2011 | Rohrbach et al. | |
| 7,907,394 B2 | 3/2011 | Richardson et al. | |
| 8,061,516 B2 | 11/2011 | Carnevali | |
| 8,074,951 B2 | 12/2011 | Carnevali | |
| 8,087,939 B2 | 1/2012 | Rohrbach et al. | |
| 8,099,138 B2 | 1/2012 | Piekarz | |
| 8,172,580 B1 | 5/2012 | Chen et al. | |
| 8,177,560 B2 | 5/2012 | Rohrbach et al. | |
| 8,183,825 B2 | 5/2012 | Sa | |
| 8,224,408 B2 | 7/2012 | Tomasini et al. | |
| 8,390,255 B1 | 3/2013 | Fathollahi | |
| 8,405,974 B2 | 3/2013 | Sayavong | |
| 8,414,312 B2 | 4/2013 | Hung et al. | |
| 8,435,042 B2 | 5/2013 | Rohrbach et al. | |
| 8,453,835 B2 | 6/2013 | So | |
| 8,483,758 B2 | 7/2013 | Huang | |
| 8,497,753 B2 | 7/2013 | DiFonzo et al. | |
| 8,560,014 B1 | 10/2013 | Hu et al. | |
| 8,634,887 B2 | 1/2014 | Hu et al. | |
| 8,639,288 B1 | 1/2014 | Friedman | |
| 8,646,698 B2 | 2/2014 | Chen et al. | |
| 8,690,582 B2 | 4/2014 | Rohrbach et al. | |
| 8,729,854 B2 | 5/2014 | Tsai et al. | |
| 8,760,311 B2 | 6/2014 | Heaton | |
| 8,763,802 B2 | 7/2014 | Ellis-Brown | |
| 8,801,441 B2 | 8/2014 | Zhang et al. | |
| 8,825,123 B1 | 9/2014 | Gudino | |
| 8,891,800 B1 | 11/2014 | Shaffer | |
| 8,907,783 B2 | 12/2014 | Fish et al. | |
| 8,911,246 B2 | 12/2014 | Carnevali | |
| 8,929,065 B2 | 1/2015 | Williams | |
| 8,950,717 B2 | 2/2015 | Chuang | |
| 8,970,332 B2 | 3/2015 | DiFonzo et al. | |
| 9,026,187 B2 | 5/2015 | Huang | |
| 9,071,060 B2 | 6/2015 | Fathollahi | |
| 9,072,172 B2 | 6/2015 | Hsu | |
| 9,112,304 B2 | 8/2015 | Rohrbach et al. | |
| 9,123,935 B2 | 9/2015 | Huang | |
| 9,172,781 B1 | 10/2015 | Goldstein | |
| 9,356,267 B1 | 5/2016 | To et al. | |
| 9,647,474 B2 | 5/2017 | Fathollahi et al. | |
| 2004/0108348 A1 | 6/2004 | Barnes | |

(56) References Cited

U.S. PATENT DOCUMENTS

| | | |
|---|---|---|
| 2005/0189354 A1 | 9/2005 | Heather et al. |
| 2006/0058073 A1 | 3/2006 | Kim |
| 2006/0175766 A1 | 8/2006 | Carnevali |
| 2009/0160400 A1 | 6/2009 | Woud |
| 2009/0314400 A1 | 12/2009 | Liu |
| 2012/0018325 A1 | 1/2012 | Kim |
| 2012/0043235 A1 | 2/2012 | Klement |
| 2012/0118773 A1 | 5/2012 | Rayner |
| 2012/0211382 A1 | 8/2012 | Rayner |
| 2012/0250270 A1 | 10/2012 | Liu |
| 2012/0261306 A1 | 10/2012 | Richardson et al. |
| 2012/0298536 A1 | 11/2012 | Rauta et al. |
| 2013/0092576 A1 | 4/2013 | Rayner |
| 2013/0106353 A1 | 5/2013 | Foster |
| 2013/0193006 A1 | 8/2013 | Bergreen et al. |
| 2013/0220841 A1 | 8/2013 | Yang |
| 2013/0258573 A1 | 10/2013 | Muday et al. |
| 2013/0273752 A1 | 10/2013 | Rudisill et al. |
| 2013/0273983 A1 | 10/2013 | Hsu |
| 2013/0331156 A1 | 12/2013 | Lui |
| 2013/0334071 A1 | 12/2013 | Carnevali |
| 2015/0146401 A1 | 5/2015 | Su et al. |
| 2015/0189780 A1 | 7/2015 | Su et al. |
| 2017/0054312 A1* | 2/2017 | Kuchynka ............... A45C 11/00 |
| 2017/0227987 A1 | 8/2017 | Carnevali et al. |
| 2018/0279809 A1* | 10/2018 | Regan ...................... A47F 5/13 |

FOREIGN PATENT DOCUMENTS

| | | |
|---|---|---|
| CN | 202565335 | 11/2012 |
| CN | 204408423 | 6/2015 |
| JP | 2004-349969 | 12/2004 |
| JP | 2014-75327 | 4/2014 |
| KR | 20-0265673 | 2/2002 |
| KR | 10-1078214 | 11/2011 |
| TW | 2003TW531119 | 5/2003 |
| TW | M422808 | 2/2012 |
| WO | 2012/052751 | 4/2012 |
| WO | 2013/081222 | 6/2013 |
| WO | 2014/054426 | 4/2014 |
| WO | 2015/022675 | 2/2015 |

OTHER PUBLICATIONS

Officeonthego.com, 3 pages of product description of Magnifico ®PLUS screen magnifier product information retrieved from web site at: www.officeonthego.com, Sep. 2, 2005.

2 pages of product information for Armor 1600 and Armor 1601 waterproof, dustproof and airtight protective cases, Sep. 2, 2005.

Jason Poel Smith: "How to Transplant RFID Chips", Sep. 3, 2013 (Sep. 3, 2013), XP55492991, Retrieved from the Internet: URL: http://www.instructables.com/id/How-to-Transplant-RFID-Chips/ [retrieved on Jul. 17, 2018].

* cited by examiner

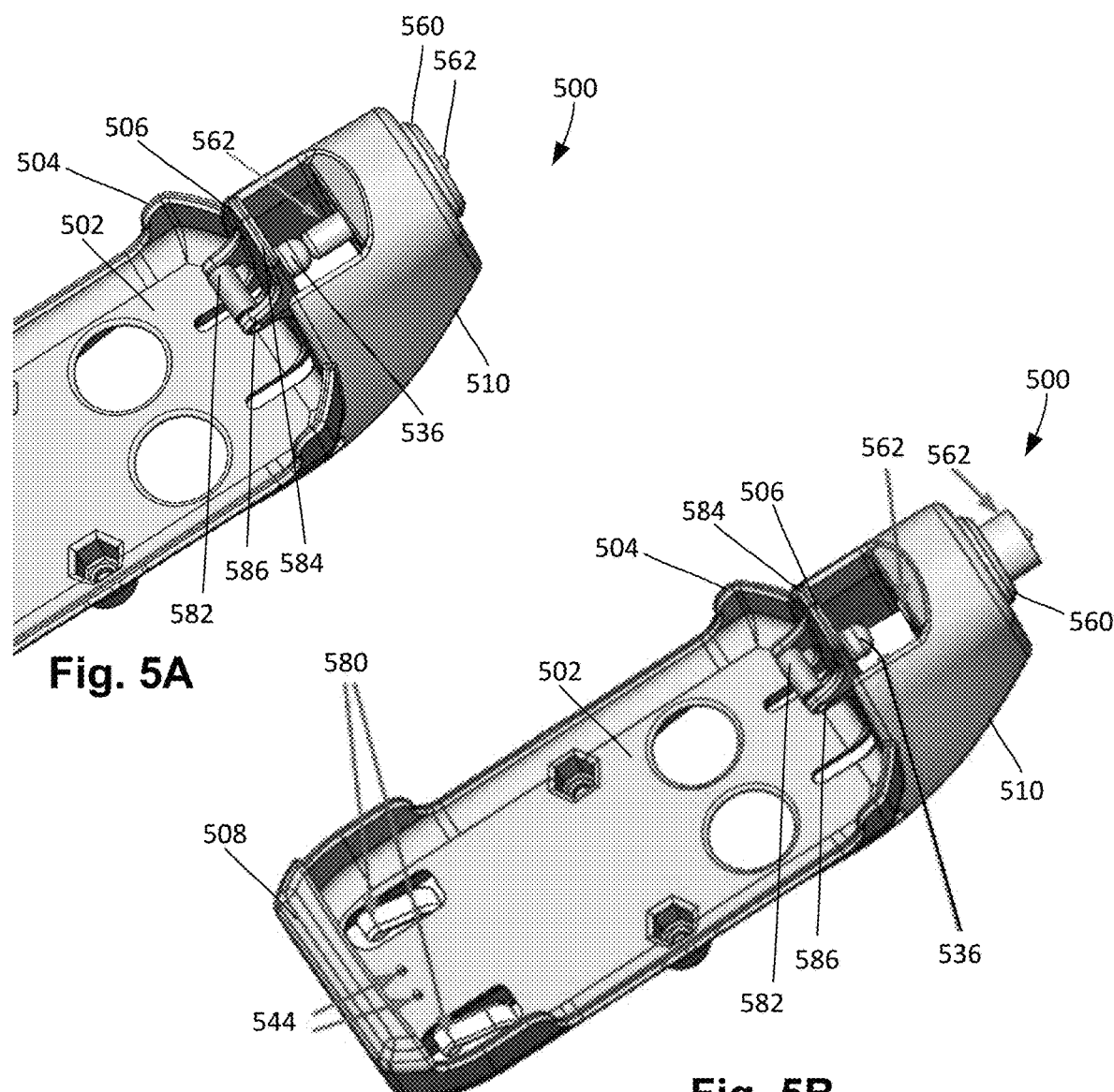

CRADLES FOR MOBILE DEVICES WITH A PLUNGER LOCK AND METHODS OF MAKING AND USING

FIELD

The present invention is directed to cradles for a mobile device. The present invention is also directed to a cradle for a mobile device that includes a plunger lock to facilitate retaining the mobile device in the cradle.

BACKGROUND

Mobile devices, such as smartphones, cellular or mobile phones, tablets, personal data assistants, and other portable devices, are now ubiquitous. Cradles can be used to protect the mobile device and to mount the mobile device onto a surface or object.

BRIEF SUMMARY

One embodiment is a cradle for a mobile device. The cradle includes a cradle base; a top element movable relative to the cradle base and configured to retain a top portion of a mobile device loaded into the cradle; a bottom element coupled to the cradle base and configured to retain a bottom portion of a mobile device or a case containing the mobile device loaded into the cradle; and a locking mechanism having a housing and a plunger at least partially disposed in the housing and configured for moving, relative to the housing, between a lock position and an unlock position. In the lock position, the plunger engages the top element to hinder movement of the top element relative to the cradle base and, in the unlock position, the plunger does not engage the top element to permit loading or unloading of the mobile device from the cradle.

In at least some embodiments, the top element includes a top cup having a top wall and sidewalls extending from the top wall and configured to receive the top portion of the mobile device. In at least some embodiments, the top element includes a protrusion extending from the top cup and configured to be engaged by the plunger in the lock position. In at least some embodiments, the top element further includes an arm extending from the top cup and the cradle base includes a channel to receive at least a portion of the arm. In at least some embodiments, the cradle further includes a biasing element disposed in the channel of the cradle base and configured to bias the top element toward the cradle base.

In at least some embodiments, the top element includes a flex arm, at least two legs extending from the flex arm, and a roller coupled to the flex arm by the at least two legs, where the flex arm is configured to be movable relative to the cradle base by flexing to facilitate loading and unloading of the mobile device from the cradle.

In at least some embodiments, the cradle further includes a base tray coupled to the cradle base and the top element. In at least some embodiments, the cradle base and the top element are slidingly coupled to the base tray with the top element disposed between the cradle base and the locking mechanism.

In at least some embodiments, the bottom element includes contacts configured to engage corresponding contacts on the mobile device or on the case containing the mobile device. In at least some embodiments, the cradle further includes a cord extending from the bottom element and including a connector electrically coupled to the contacts.

Another embodiment is a cradle for a mobile device. The cradle includes a base tray; a cradle base slidable relative to the base tray; a top cup slidable relative to the base tray and configured to retain a top portion of a mobile device loaded into the cradle; a bottom device receiver coupled to the cradle base and configured to retain a bottom portion of a mobile device or a case containing the mobile device loaded into the cradle; and a locking mechanism having a housing and a plunger at least partially disposed in the housing and configured for moving, relative to the housing, between a lock position and an unlock position. In the lock position, the plunger engages the top cup to hinder movement of the top cup relative to the cradle base and, in the unlock position, the plunger does not engage the top cup to permit loading or unloading of the mobile device from the cradle.

In at least some embodiments, the top cup includes a top wall and sidewalls extending from the top wall and configured to receive the top portion of the mobile device. In at least some embodiments, the top cup includes a protrusion extending from the top cup and configured to be engaged by the plunger in the lock position.

In at least some embodiments, the top cup further includes an arm extending from the top cup and the cradle base includes a channel to receive at least a portion of the arm. In at least some embodiments, the cradle further includes a biasing element disposed in the channel of the cradle base and configured to bias the top element toward the cradle base.

In at least some embodiments, the bottom device receiver includes contacts configured to engage corresponding contacts on the mobile device or on the case containing the mobile device. In at least some embodiments, the cradle further includes a cord extending from the bottom device receiver and including a connector electrically coupled to the contacts.

Yet another embodiment is a cradle for a mobile device. The cradle includes a base tray; a top housing coupled to the base tray; a cradle base slidable relative to the base tray and including at least one fastener extending between to the base tray for a user to fixedly position the cradle base relative to the base tray; a top cup slidable relative to the base tray and disposed between the cradle base and the top housing, where the top cup is configured to retain a top portion of a mobile device loaded into the cradle and the top cup is biased toward the cradle base; and a bottom device receiver coupled to the cradle base and configured to retain a bottom portion of a mobile device or a case containing the mobile device loaded into the cradle.

In at least some embodiments, the top cup further includes an arm extending from the top cup and the cradle base includes a channel to receive at least a portion of the arm, where the cradle further include a biasing element disposed in the channel of the cradle base and configured to bias the top element toward the cradle base. In at least some embodiments, the bottom device receiver includes a recess and contacts disposed in the recess and configured to engage corresponding contacts on the mobile device or on the case containing the mobile device.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 5A is a schematic perspective close-up view of a portion of yet another embodiment of a cradle with the plunger of a locking mechanism in the lock position, according to the invention; and FIG. 5B is a schematic perspective top view of the cradle of FIG. 5A with the plunger in the unlock position, according to the invention.

DETAILED DESCRIPTION

Figure 1A:
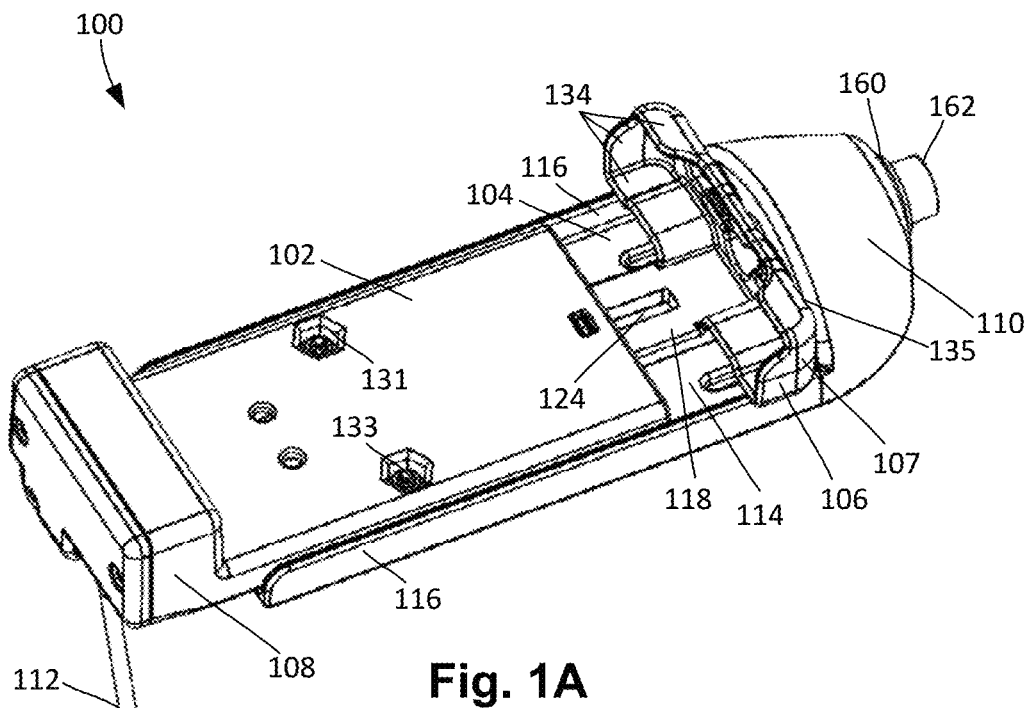
FIG. 1A is a schematic perspective top view of one embodiment of a cradle for a mobile device, according to the invention.
Figure 1B:
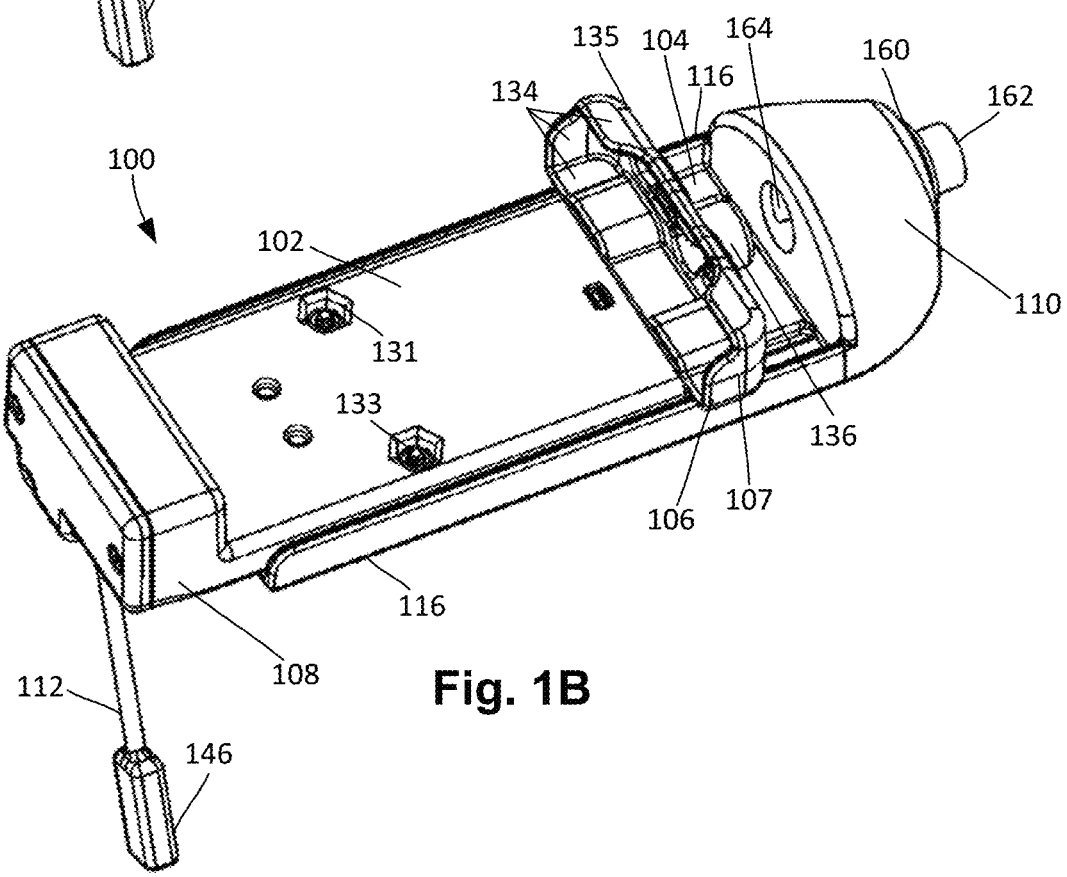
FIG. 1B is a schematic perspective top view of the cradle of FIG. 1A with the top cup disposed adjacent the cradle base, according to the invention.
Figure 1C:
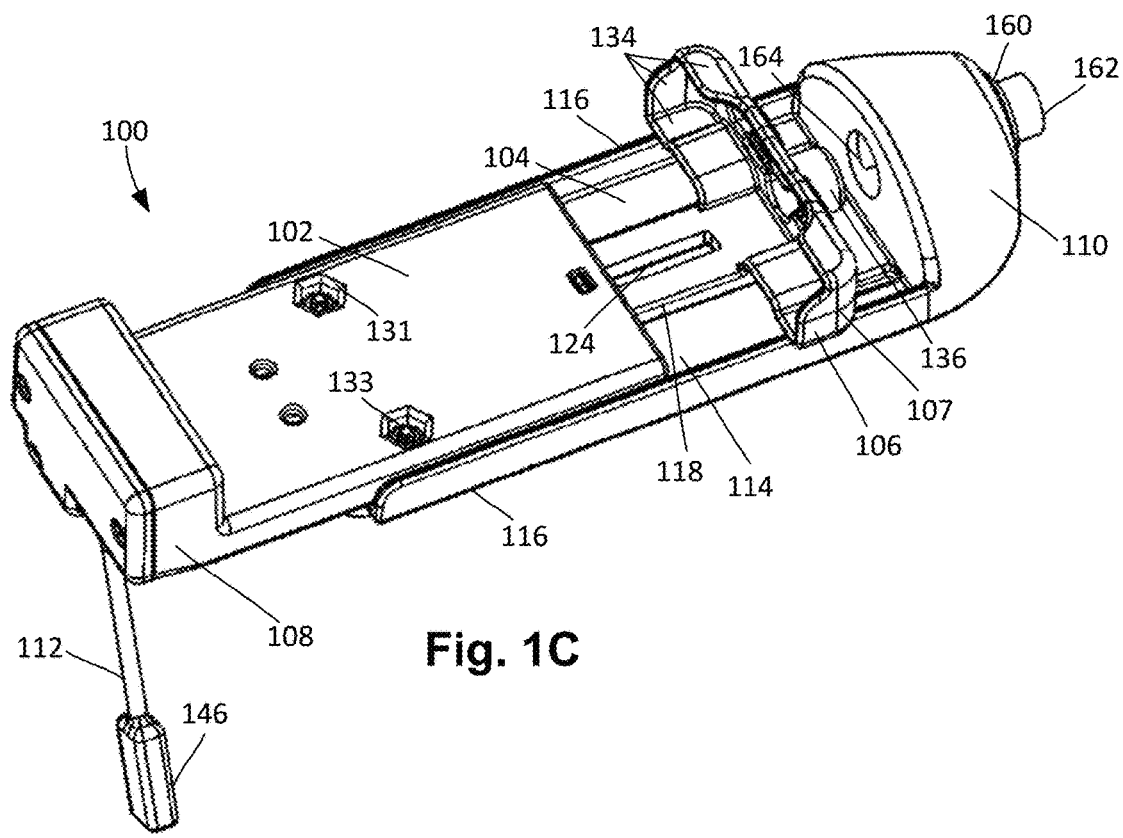
FIG. 1C is a schematic perspective top view of the cradle of FIG. 1A with the cradle base slid further along the base tray, according to the invention.

The present invention is directed to cradles for a mobile device. The present invention is also directed to a cradle for a mobile device that includes a plunger lock to facilitate retaining the mobile device in the cradle.

FIGS. 1A to 1E illustrate one embodiment of a cradle 100 for a mobile device, such as a cellular or mobile phone, a smartphone, a tablet, a personal data assistant, or any other suitable mobile device. The cradle 100 includes a cradle base 102, a base tray 104, a top cup 106 for receiving a top portion of the mobile device, a bottom device receiver 108 coupled to the cradle base 102, a locking mechanism 110, and an optional connector cord 112 extending from the bottom device receiver. The locking mechanism 110 is coupled to the base tray 104. In at least some embodiments, the locking mechanism 110 is optional and can be replaced by a housing without a locking mechanism.

In at least some embodiments, an optional mount 111 (FIG. 1D) is coupled or coupleable to the cradle 100. Non-limiting examples of mounts 111 can be found at U.S. Pat. Nos. 5,845,885; 6,561,476; 7,320,50; 7,997,554; 8,454,178; 8,505,861; 9,831,904; RE42,060; RE42,581; and RE43,806, all of which are incorporated herein by reference. In the illustrated embodiment, the mount 111 includes a mount base 150 that is coupled to the cradle base 100, a narrow neck 152 attached to the mount base, and a ball 154 attached to the narrow neck. One or more of the base 150, the narrow neck 152, and the ball 154 can be replaced by any other suitable mounting arrangement.

The cradle base 102 is slidingly coupled to the base tray 104 to permit use of the cradle with mobile devices of different lengths. The base tray 104 includes a back plate 114 and opposing sidewalls 116. In at least some embodiments, at least a portion of the sidewalls 116 of the base tray 104 curve near the top of the sidewalls to be partially disposed over the cradle base 102 to retain a portion of the cradle base inside a cavity formed by the base tray 104.

Figure 1D:
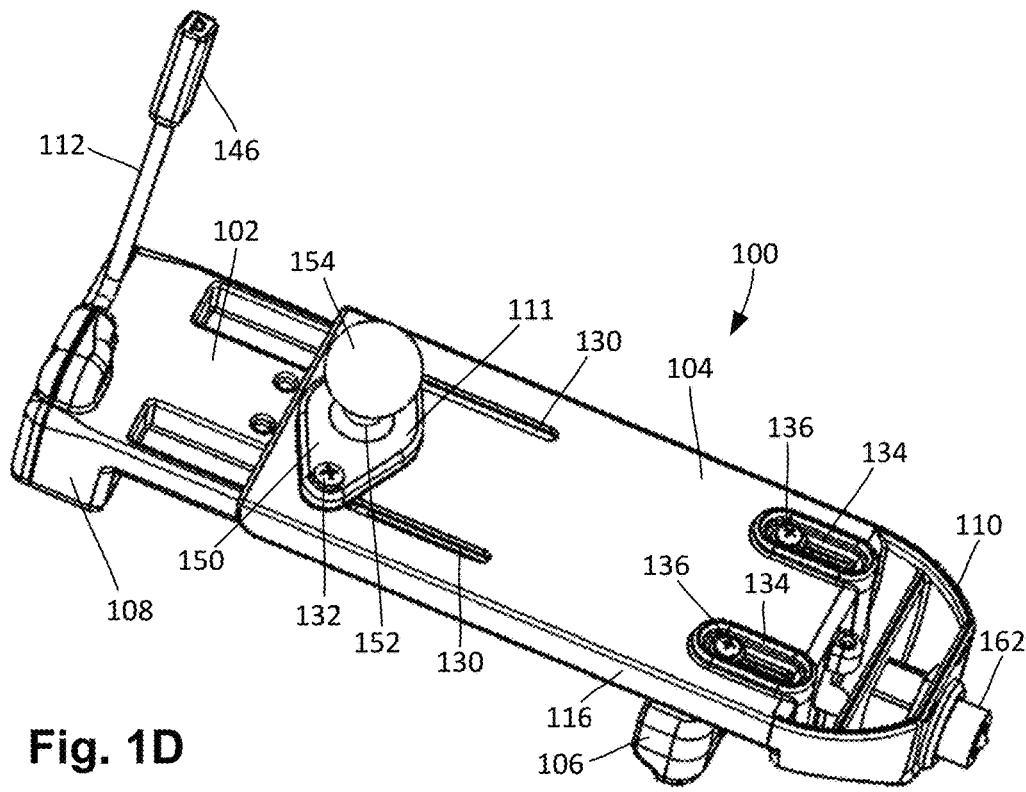
FIG. 1D is a schematic perspective bottom view of the cradle of FIG. 1C, according to the invention.

As illustrated in FIG. 1D, the back plate 114 of the base tray 104 includes one or more elongated openings 130. A fastener 132, such as a screw or bolt, extends through each opening 130 and is attached to the cradle base 102 to retain the cradle base on the base tray 104. In the illustrated embodiment, the cradle base 102 includes an aperture 131 for each fastener 132 and a nut 133 disposed in each aperture and coupled to the corresponding fastener. The elongate opening 130 allows the fastener 130 to move with the cradle base 102, but may also limit how far the cradle base 102 can move away from the locking mechanism 110 as the end of the elongate opening 130 will hinder further movement of the cradle base by acting as a stop to the fastener. In at least some embodiments, the cradle base 102 and base tray 104 are adjusted to hold the mobile device, based on the length of the mobile device, and then the fasteners 130 are tightened to hold the cradle base 102 and base tray 104 in a fixed arrangement so that the cradle base 102 will not slide relative to the base tray 104 until the fasteners are loosened. In at least some embodiments, the fastener 130 can also be used to fasten the mount 112 to the cradle 100, as illustrated in FIG. 1D.

The top cup 106 is slidingly coupled to the base tray 104 between the cradle base 102 and the locking mechanism 110. In at least some embodiments, the base tray 104 includes one or more additional elongated openings 134 in the back plate 114 and a fastener 136 extends through each opening 132 and is attached to the top cup 106 to retain the top cup on the base tray 104. In operation, the fasteners 136 are not tightened against the back plate 114 of the base tray 104 so that the top cup 106 can move relative to the cradle base 102 to permit loading and unloading of the mobile device from the cradle 100. In at least some embodiments, the additional elongated openings 134 are counterbored on the back of the back plate 114 so that, at least in some embodiments, the head of each fastener 136 below the back surface of the back plate 114.

The top cop 106 includes a cup portion 107 with a top wall 135 and sidewalls 134 extending from the top wall to engage two or more of the front, back, or side surfaces of the top portion of the mobile device in order to retain the mobile device in the cradle. In at least some embodiments, the top wall 135 (and, optionally, one or more of the sidewalls 134) of the cup portion 107 may include one or more openings 137 (FIG. 2) for access to a speaker, microphone, button, or other element on the mobile device. In at least some embodiments, the top cup 106 includes a protrusion 136 extending from the top wall 135 toward the locking mechanism 110 and configured to engage the locking mechanism 110 to lock the mobile device in the cradle when the locking mechanism is in a lock position, as described below.

The top cup 106 also includes an arm 118 that attaches to and extends away from the cup portion 107 and into a channel 120 (FIG. 2) in the cradle base 102. The top cup 106 is biased toward the cradle base 102 to hold the mobile device in the cradle 100. In at least some embodiments, a spring 122 (FIG. 3A) or other biasing element is positioned in the channel 120 in a cavity 124 formed by the arm 118. The arm 118 includes a stop 126 and the cradle base 102 include has a spring fastener arrangement 128 that attaches the spring 122 to the cradle base. (Other biasing arrangements of the spring 122 or other biasing element, the arm 118, and the cradle base 102 can be used.) As the top cup 106 is pushed away from the cradle base 102 toward the locking mechanism 110, the spring 122 is compressed. This allows a mobile device to be loaded into the cradle 100, as described below. When force pushing the top cup 106 toward the locking mechanism 110 is removed or relaxed, the spring 122 biases the top cup toward the cradle base 102 to hold and retain the mobile device in the cradle 100.

Figure 1E:
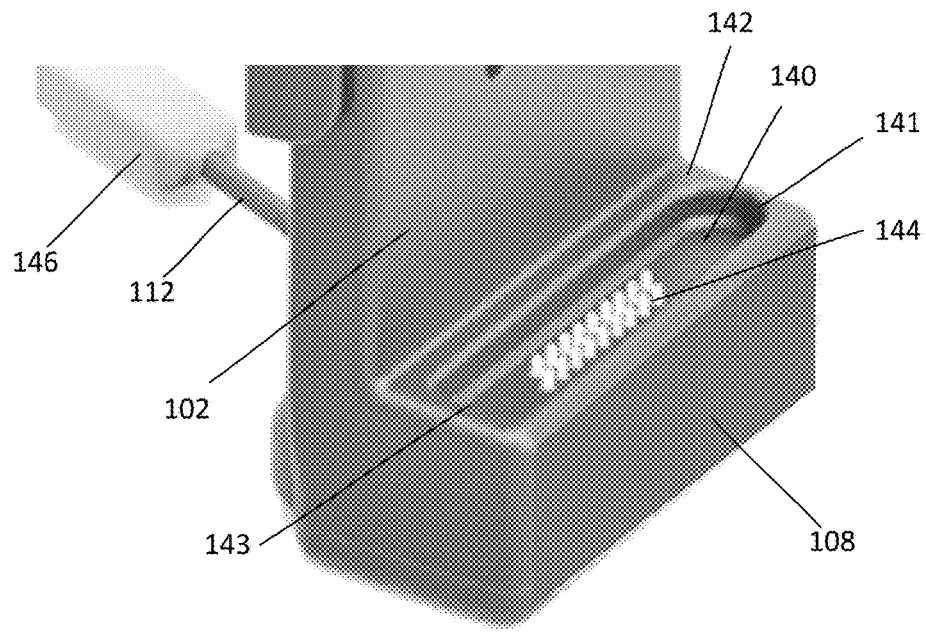
FIG. 1E is a schematic perspective side view of a portion of the case of FIG. 1A showing contacts in the bottom device receiver, according to the invention.

The bottom device receiver 108 is attached to the cradle base 102 and may be integrally formed with the cradle base or may be detachable from the cradle base. FIG. 1E illustrates one embodiment of the bottom device receiver 108 which includes a recess 140 surrounded by a rim 142. In the embodiment of FIG. 1E, the recess 140 includes one or more contacts 144 and forms a female connector.

In at least some embodiments, the contacts 144 can make electrical contact with contacts on the mobile device or a case disposed on the mobile device. Examples of cases with contacts include, but are not limited to, the cases, covers, or skins described in U.S. Pat. Nos. 9,195,279; 9,331,444; 9,529,387; 9,602,639; 9,632,535; 9,706,026; 10,050,658; 10,054,984; 10,389,399; 10,454,515; and 10,630,334 and U.S. patent application Ser. Nos. 16/853,544 and 16/866, 156, all of which are incorporated herein by reference in their entireties. The contacts 144 in the cradle 100 can be used to transfer power to the mobile device from a power source, transfer data between the mobile device and a data source, or any combination thereof. In at least some embodiments, the contacts 144 are biasing contacts, such as biasing pogo pins or biasing leaf springs, that can move up or down in the bottom device receiver 108. Other types of contacts can also be used. Any arrangement of the contacts 144 can be used including, but not limited to, an arrangement of the contacts in one or more rows. When the arrangement includes two or more rows, the contacts in the rows can be aligned or staggered, as illustrated in FIG. 1E.

In at least some embodiments, the shape of the recess 140 can be complementary to a male structure of a case (see, for example, the cases, covers, or skins in the references cited above) or mobile device. In the illustrated embodiment of FIG. 1E, the recess has an asymmetric shape with one end 141 being curved and another end being straight 143.

The cradle 100 can include an optional connector cord 112 that is electrically coupled to the contacts 144 and coupleable to a power source, data source, or any combination thereof. The optional connector cord 112 can be hardwired to a device or can include any type of connector 146, as illustrated in FIGS. 1A to 1D, including, but not limited to, any type of USB connector, a Lightning connector, or the like or any combination thereof. Alternatively, instead of a connector cord, the bottom device receiver 108 can include a connector (or jack), such as a female or male connector. A connector cord can be coupled to this connector with the connector cord attached or attachable to a power source, a data source, or any combination thereof. The connector can be any type of connector including, but not limited to, any type of USB connector, a Lightning connector, or the like or any combination thereof.

Figure 2:
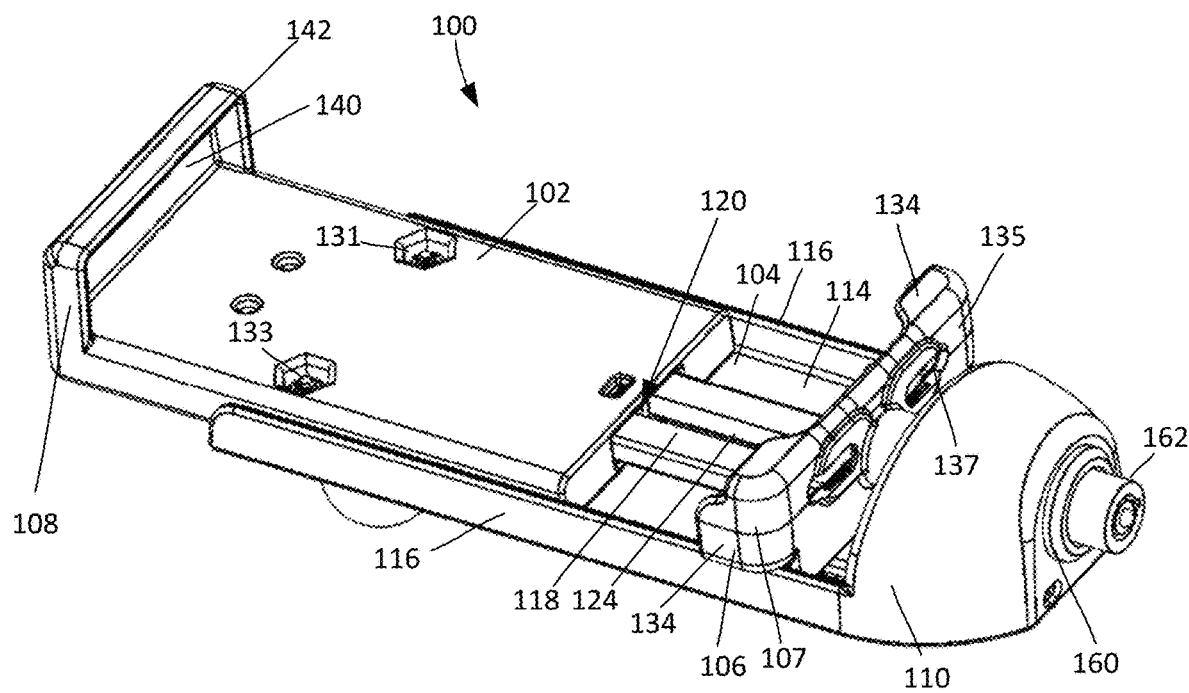
FIG. 2 is a schematic perspective top view of another embodiment of a cradle for a mobile device, according to the invention.

FIG. 2 illustrates another embodiment of a bottom device receiver 108 that includes a recess 140 and rim 142 but does not include contacts 144. The bottom device receiver 108 can receive the bottom of the mobile device or a case containing the mobile device In at least some embodiments without contacts 144, the bottom device receiver 108 can be made thinner, as illustrated in FIG. 2, as there is hardware couple the contacts 144 to a connector cord 112 or connector.

In at least some embodiments, a locking mechanism 110 is attached to the base tray 104 and includes a housing 160 and a plunger 162. The plunger 162 can be moved from a lock position (FIGS. 3A to 3D) to an unlock position (FIG. 3E) by pushing the plunger into housing 160 and can be moved from the lock position to the unlock position by releasing the plunger.

In the unlock position, the plunger 162 extends out of the housing 160. In the lock position, the plunger 162 is pushed into the housing 160 and engages a portion of the top cup 106, such as the protuberance 136. In at least some embodiments, the housing 160 of the locking mechanism includes a port 164 (FIG. 1B) into which the protuberance 136 of the top cup 106 can be pushed, as illustrated in FIGS. 3C and 3D. The engagement of the top cup 106 by the plunger 162 prevents or hinders movement of the top cup which prevents or hinders withdrawal of the mobile device 170 from the cradle 100 as the top cup 106 cannot be pushed toward the locking mechanism 110. In the unlock position, the plunger 162 is retracted from engagement with the top cup 106 which allows the top cup 106 to move toward the locking mechanism 110 to allow loading or unloading of the mobile device 170.

In at least some embodiments, the plunger 162 requires a tool, such as a key, to lock the plunger in the lock position and to release the plunger, when locked using the tool, from the lock position to the unlock position. In some embodiments, the tool may be rotated or otherwise operated in the process of locking or unlocking the plunger 162 from the lock position. The use of a tool to lock the plunger may reduce the likelihood that the plunger 162 will be inadvertently released due to vibration, shock, or other handling or movement of the cradle 100. In other embodiments, the plunger 162 and housing 160 can be arranged so that, after pushing the plunger to the lock position, the plunger remains in the lock position until the plunger is again pushed.

Figure 3A:
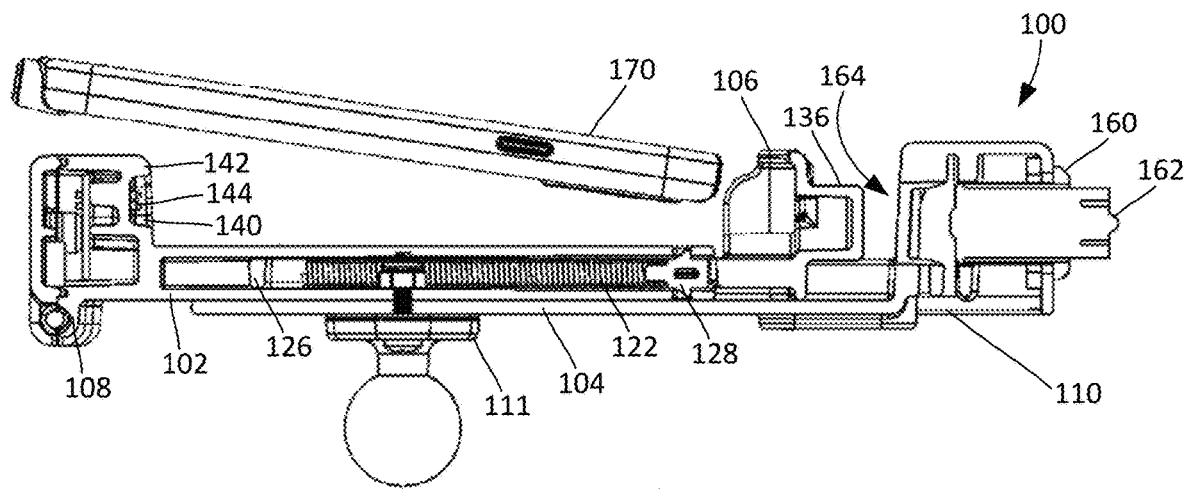
FIG. 3A is a schematic perspective view of a mobile device and the cradle of FIG. 1A prior to insertion of the mobile device into the cradle, according to the invention.
Figure 3B:
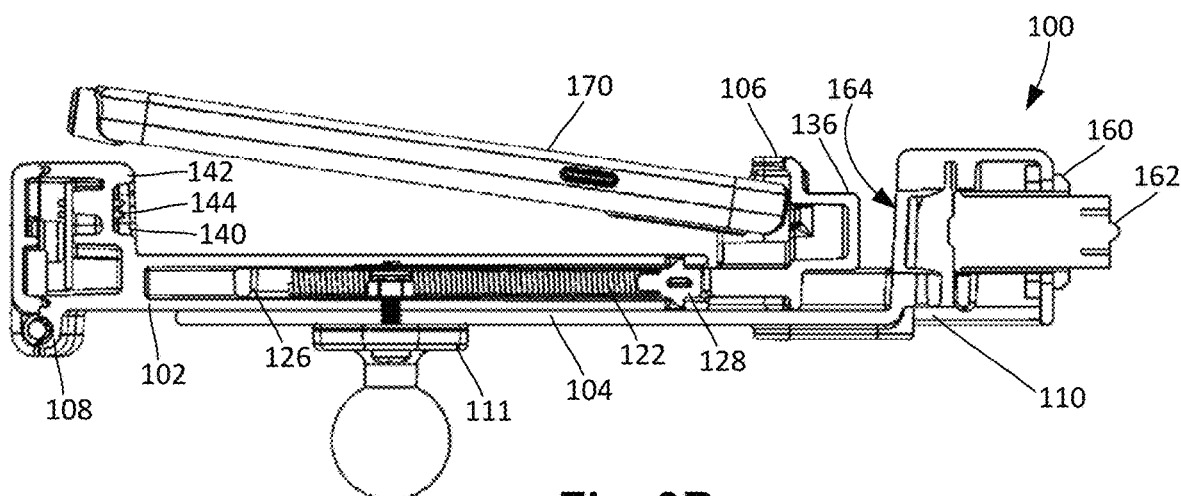
FIG. 3B is a schematic side cross-sectional view of an initial insertion of a bottom portion of the mobile device into the top cup of the cradle of FIG. 1A, according to the invention.
Figure 3C:
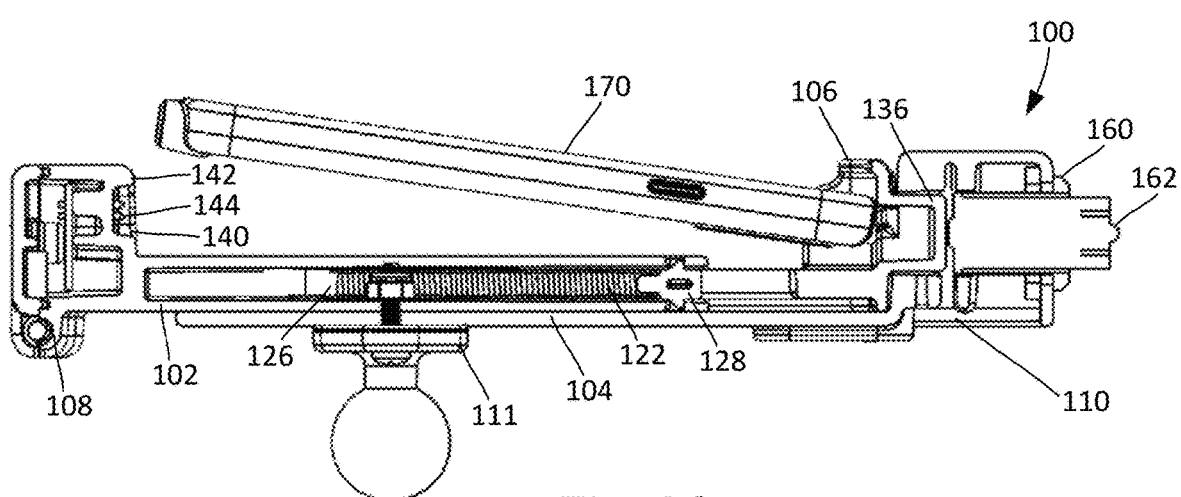
FIG. 3C is a schematic side cross-sectional view of the pushing of the top cup of the cradle of FIG. 1A toward the locking mechanism to continue the insertion of the mobile device into the cradle, according to the invention.
Figure 3D:
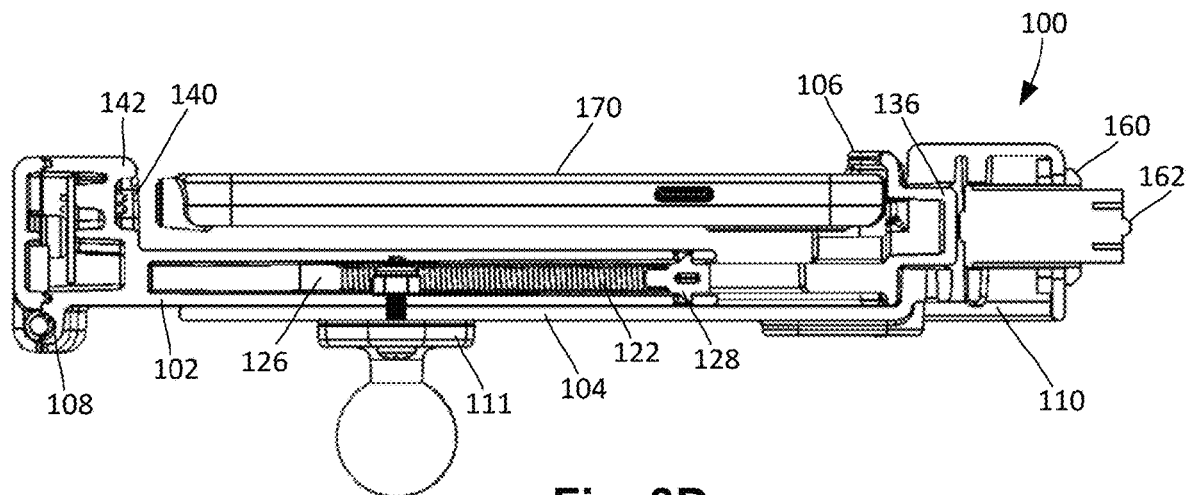
FIG. 3D is a schematic side cross-sectional view of continuing insertion of the mobile device into the cradle of FIG. 1A, according to the invention.

FIGS. 3A to 3E illustrate the loading of a mobile device 170 into one embodiment of the cradle 100. In FIG. 3A, the cradle 100 has the plunger 162 in the unlock position and the cradle 100 is available to load the mobile device 170. In FIG. 3B, the top of the mobile device is inserted into the top cup 106. In FIG. 3C, the top cup 106 is pushed toward the locking mechanism 100 to provide clearance for the bottom of the mobile device 170 to be inserted into the cradle 100.

The top cup 106 can be pushed directly by the user or indirectly using the mobile device 170.

Figure 3E:
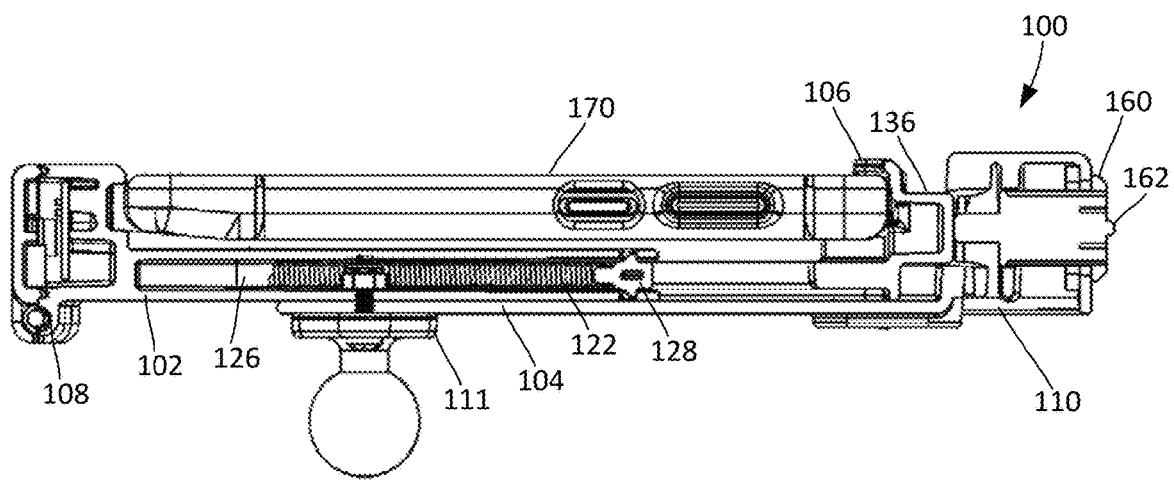
FIG. 3E is a schematic side cross-sectional view of the mobile device inserted into the cradle of FIG. 1A and the locking mechanism in the lock position, according to the invention.

In FIG. 3D, the mobile device 170 is inserted in the cradle 100. In FIG. 3E, the force on the top cup 106 is relaxed and the top cup moves toward the cradle base 100. The bottom of the mobile device 170 (or the bottom of case that contains the mobile device) is seated into the recess 140 of the bottom device receiver 108. If there are contacts 144 in the recess 140 and contacts on the mobile device 170 or case that contains the mobile device, the contacts 144 engage the contacts on the mobile device or case.

In FIG. 3E, the plunger 162 has been pushed to the lock position so that the plunger engages the protuberance 136 on the top cup 106 which prevents the top cup from moving to release the mobile device 170 from the cradle 100. Thus, in FIG. 3E, the mobile device 170 is loaded into the cradle 100 and locked in the cradle.

To unload the mobile device, the plunger 162 is released from the locked position. Once unlocked, the mobile device 170 and top cup 106 are pushed toward the locking mechanism 100 and the mobile device is then removed in a reverse application of the steps to load the mobile device.

Figure 4A:
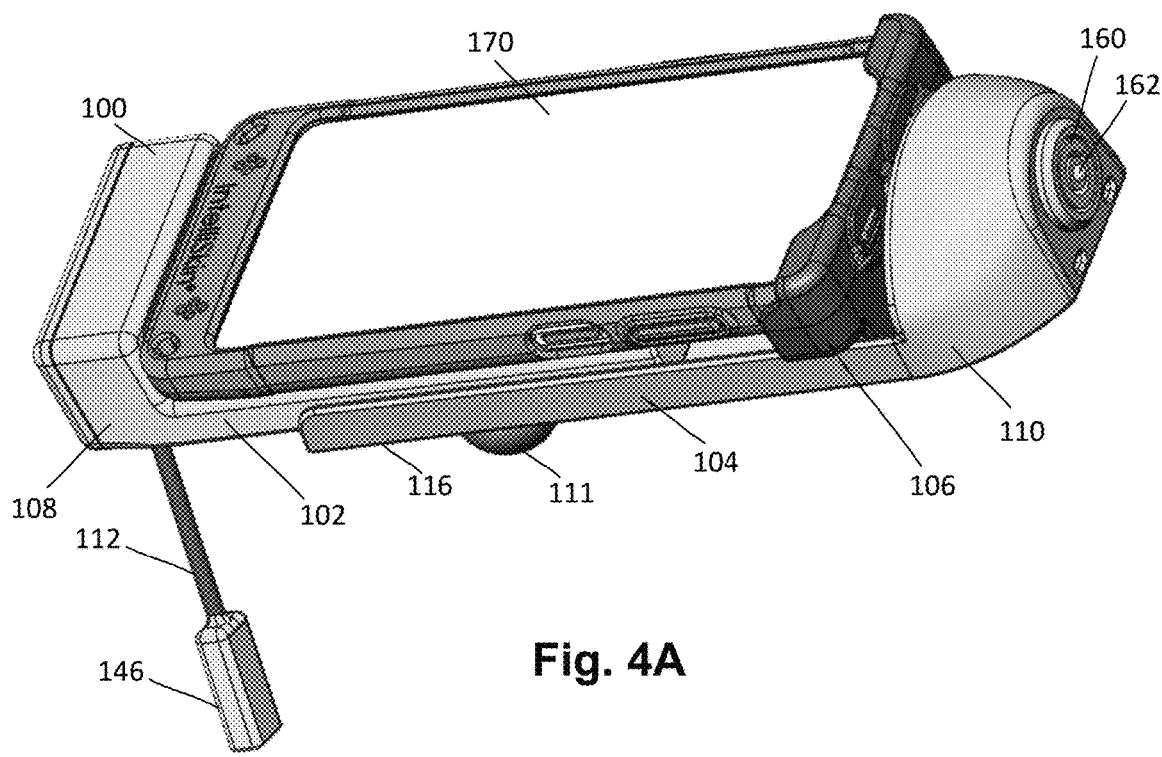
FIG. 4A is a schematic perspective top view of the cradle of FIG. 1A with a mobile device loaded, according to the invention.
Figure 4B:
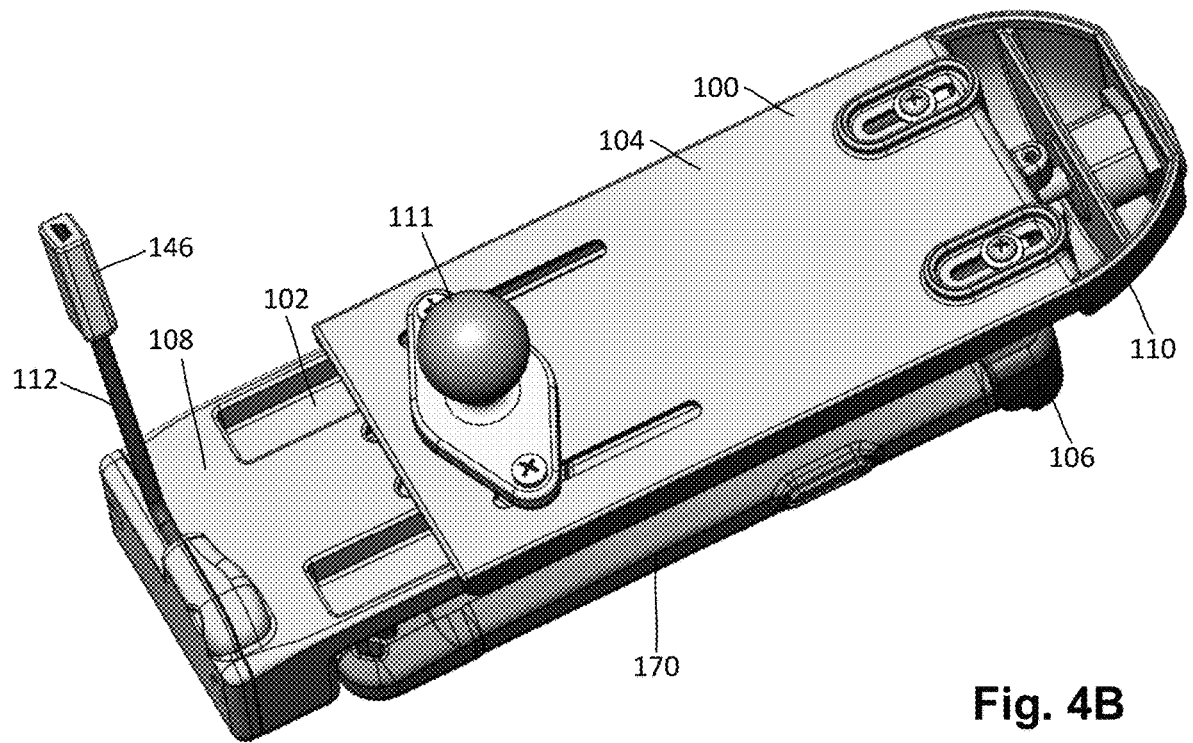
FIG. 4B is a schematic perspective bottom view of the cradle of FIG. 1A with a mobile device loaded, according to the invention.

FIGS. 4A and 4B illustrate a mobile device 170 disposed in one embodiment of the cradle. In at least some embodiments, the top cup 106 or the bottom device receiver 108 or both can be replaced with different components to fit different sizes of mobile devices. In some embodiments, the recess 140 in the bottom device receiver 108 is configured to receive a male structure from a case containing the mobile device. This male structure may be uniformly sized for a variety of different sized mobile devices (for example, mobile phones and tablets). In such cases, only replacement of the top cup 106 may be needed to fit a different size of mobile device (for example, to fit a tablet instead of a mobile phone.)

FIGS. 5A and 5B illustrate another embodiment of a cradle 500 with a locking mechanism 510 that utilizes a plunger 562. This embodiment and related embodiments are described in U.S. patent application Ser. No. 16/883,743 (entitled "Cradle for Mobile Devices With One or More Biasing Tabs and Methods of Making and Using"), filed on even date herewith, incorporated herein by reference in its entirety.

The cradle 500 includes a base 502, sidewalls 504 extending from the base to define a cavity 105 for receiving the mobile device, a roller latch 506 extending from the base, a locking mechanism 510, and a cup 508. The cradle 500 also includes contacts 544 extending out of the base 102 for coupling to contacts on the mobile device or a case of the mobile device, as well as one or more biasing tabs 580 extending out of the base for protecting the contacts 544 during insertion of the mobile device into the cradle 500. In at least some embodiments, the roller latch 506 includes a roller 582 rotating on an axle and is coupled to a flex arm 584 by at least two legs 586. The flex arm 584 optionally includes a protrusion 536 to engage the plunger 562 in the lock position (FIG. 5A).

The embodiments describe above have common elements including, for example, a cradle base (for example, cradle base 102 rubase 502); a top element (for example, top cup 106 ruroller latch 506) movable relative to the cradle base and configured to retain a top portion of a mobile device loaded into the cradle; a bottom element (for example, bottom device receiver 108 or cup 508) coupled to the cradle base and configured to retain a bottom portion of a mobile device or case of mobile device loaded into the cradle; and a locking mechanism 110, 510 comprising a housing 160, 560 and a plunger 162, 562 partially disposed in the housing and configured for moving, relative to the housing, between a lock position and an unlock position. In the lock position, the plunger 162, 562 engages the top element (for example, top cup 106 and roller latch 506) to hinder movement of the top element relative to the cradle base (for example, cradle base 102 or base 502) and, in the unlock position, the plunger does not engage the top element to permit loading or unloading of the mobile device from the cradle.

The above specification provides a description of the manufacture and use of the invention. Since many embodiments of the invention can be made without departing from the spirit and scope of the invention, the invention also resides in the claims hereinafter appended.

What is claimed as new and desired to be protected by Letters Patent of the United States is:

1. A cradle for a mobile device, the cradle comprising:
   a cradle base;
   a top element movable relative to the cradle base and configured to retain a top portion of a mobile device loaded into the cradle;
   a bottom element coupled to the cradle base and configured to retain a bottom portion of a mobile device or a case containing the mobile device loaded into the cradle; and
   a locking mechanism comprising a housing and a plunger at least partially disposed in the housing and configured for moving, relative to the housing, between a lock position and an unlock position, wherein, in the lock position, the plunger engages the top element to hinder movement of the top element relative to the cradle base and, in the unlock position, the plunger does not engage the top element to permit loading or unloading of the mobile device from the cradle.

2. The cradle of claim 1, wherein the top element comprises a top cup comprising a top wall and a plurality of sidewalls extending from the top wall and configured to receive the top portion of the mobile device.

3. The cradle of claim 2, wherein the top element comprises a protrusion extending from the top cup and configured to be engaged by the plunger in the lock position.

4. The cradle of claim 2, wherein the top element further comprises an arm extending from the top cup and the cradle base comprises a channel to receive at least a portion of the arm.

5. The cradle of claim 4, further comprising a biasing element disposed in the channel of the cradle base and configured to bias the top element toward the cradle base.

6. The cradle of claim 1, wherein the top element comprises a flex arm, at least two legs extending from the flex arm, and a roller coupled to the flex arm by the at least two legs, wherein the flex arm is configured to be movable relative to the cradle base by flexing to facilitate loading and unloading of the mobile device from the cradle.

7. The cradle of claim 1, further comprising a base tray coupled to the cradle base and the top element.

8. The cradle of claim 7, wherein the cradle base and the top element are slidingly coupled to the base tray with the top element disposed between the cradle base and the locking mechanism.

9. The cradle of claim 1, wherein the bottom element comprises a plurality of contacts configured to engage corresponding contacts on the mobile device or on the case containing the mobile device.

10. The cradle of claim 9, further comprising a cord extending from the bottom element and comprising a connector electrically coupled to the contacts.

11. A cradle for a mobile device, the cradle comprising:
a base tray;
a cradle base slidable relative to the base tray;
a top cup slidable relative to the base tray and configured to retain a top portion of a mobile device loaded into the cradle;
a bottom device receiver coupled to the cradle base and configured to retain a bottom portion of a mobile device or a case containing the mobile device loaded into the cradle; and
a locking mechanism comprising a housing and a plunger at least partially disposed in the housing and configured for moving, relative to the housing, between a lock position and an unlock position, wherein, in the lock position, the plunger engages the top cup to hinder movement of the top cup relative to the cradle base and, in the unlock position, the plunger does not engage the top cup to permit loading or unloading of the mobile device from the cradle.

12. The cradle of claim 11, wherein the top cup comprises a top wall and a plurality of sidewalls extending from the top wall and configured to receive the top portion of the mobile device.

13. The cradle of claim 11, wherein the top cup comprises a protrusion extending from the top cup and configured to be engaged by the plunger in the lock position.

14. The cradle of claim 11, wherein the top cup further comprises an arm extending from the top cup and the cradle base comprises a channel to receive at least a portion of the arm.

15. The cradle of claim 14, further comprising a biasing element disposed in the channel of the cradle base and configured to bias the top element toward the cradle base.

16. The cradle of claim 11, wherein the bottom device receiver comprises a plurality of contacts configured to engage corresponding contacts on the mobile device or on the case containing the mobile device.

17. The cradle of claim 16, further comprising a cord extending from the bottom device receiver and comprising a connector electrically coupled to the contacts.

18. A cradle for a mobile device, the cradle comprising:
a base tray;
a top housing coupled to the base tray;
a cradle base slidable relative to the base tray and comprising at least one fastener extending to the base tray for a user to fixedly position the cradle base relative to the base tray;
a top cup slidable relative to the base tray and disposed between the cradle base and the top housing, wherein the top cup is configured to retain a top portion of a mobile device loaded into the cradle and the top cup is biased toward the cradle base; and
a bottom device receiver coupled to the cradle base and configured to retain a bottom portion of a mobile device or a case containing the mobile device loaded into the cradle.

19. The cradle of claim 18, wherein the top cup further comprises an arm extending from the top cup and the cradle base comprises a channel to receive at least a portion of the arm, wherein the cradle further comprises a biasing element disposed in the channel of the cradle base and configured to bias the top cup toward the cradle base.

20. The cradle of claim 18, wherein the bottom device receiver comprises a recess and a plurality of contacts disposed in the recess and configured to engage corresponding contacts on the mobile device or on the case containing the mobile device.

* * * * *